A. B. MANCHESTER.
SHOCK ABSORBER FOR DRIVE SHAFTS.
APPLICATION FILED NOV. 2, 1920.
1,400,368. Patented Dec. 13, 1921.
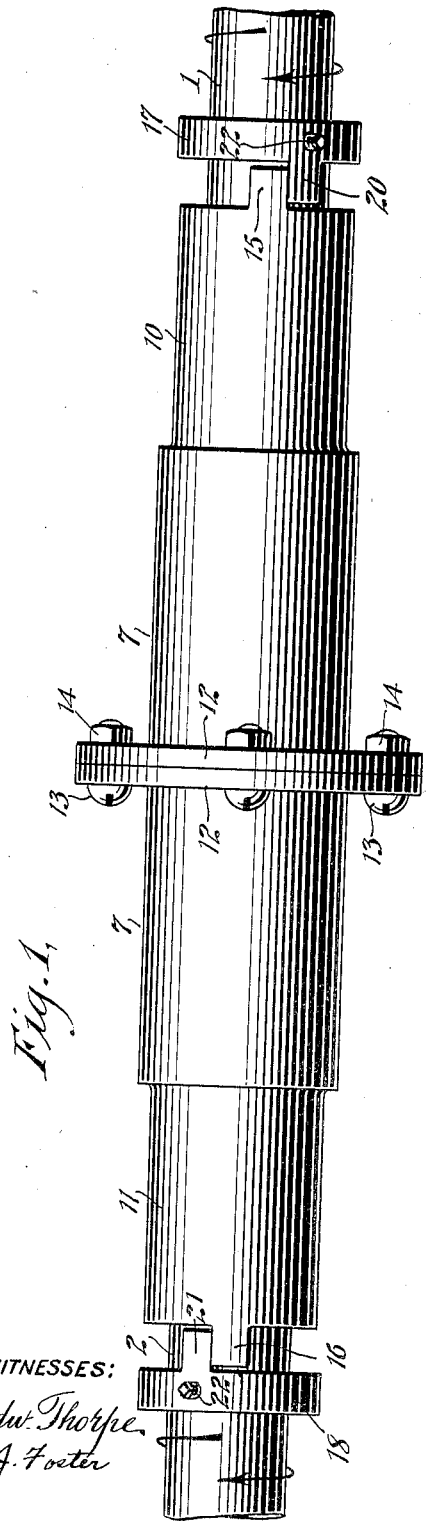
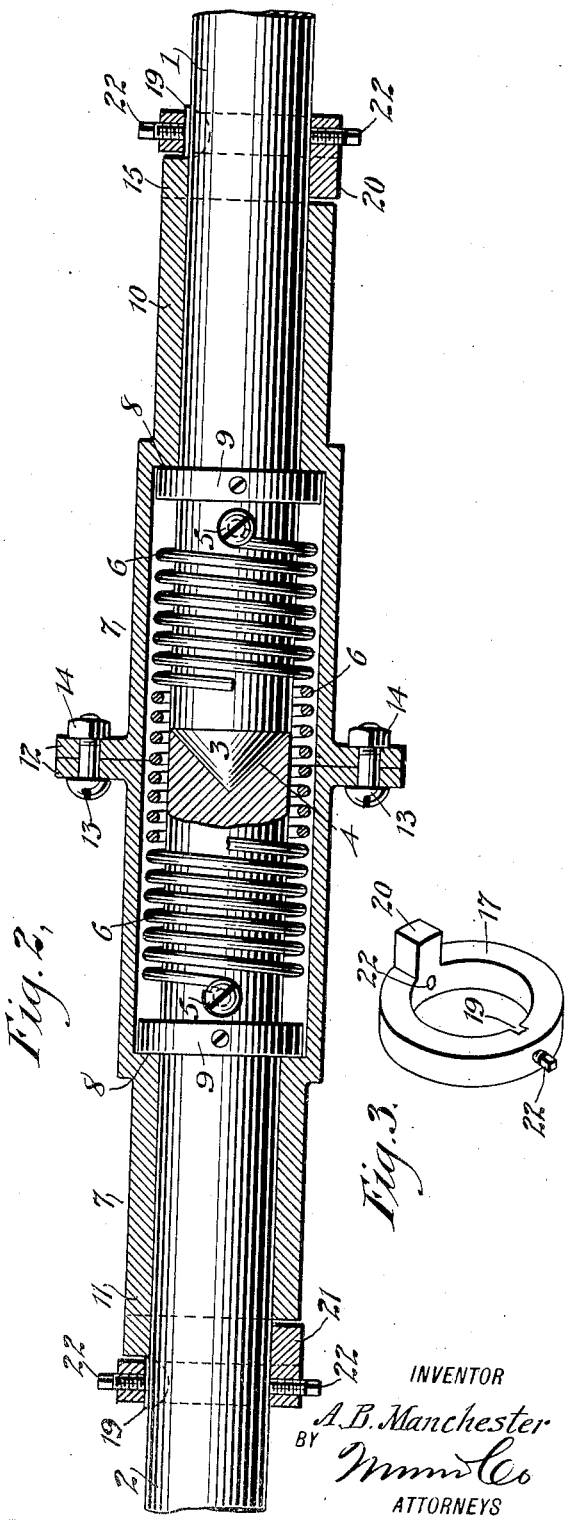

UNITED STATES PATENT OFFICE.

ANSEL BRUSH MANCHESTER, OF LOS ANGELES, CALIFORNIA.

SHOCK-ABSORBER FOR DRIVE-SHAFTS.

1,400,368.  Specification of Letters Patent.  Patented Dec. 13, 1921.

Application filed November 2, 1920. Serial No. 421,215.

*To all whom it may concern:*

Be it known that I, ANSEL BRUSH MANCHESTER, a citizen of the United States, and a resident of the city of Los Angeles, in the county of Los Angeles and State of California, have invented certain new and useful Improvements in Shock-Absorbers for Drive-Shafts, of which the following is a full, clear, and exact description.

This invention relates to improvements in shock absorbers for drive shafts, an object of the invention being to provide a shock absorbing mechanism of this character, which will serve as a cushion either between the transmission and the differential, or between the engine and the transmission, of an automobile driving mechanism.

A further object is to provide a mechanism of the character stated, which will prevent sudden strains on the transmission and differential on rough roads, prevent jerky motion of the car when the clutch is thrown in, or when the car runs ahead of the engine, or when the emergency brake is applied.

A still further object is to provide a shock absorber for the drive shaft, which will tend to prolong the life of the entire driving mechanism.

With these and other objects in view, the invention consists in certain novel features of construction and combinations and arrangements of parts as will be more fully hereinafter described and pointed out in the appended claims.

In the accompanying drawings:

Figure 1 is a view in elevation of my improved shock absorbing device in position on a shaft, when the shaft is turning, the arrows indicate the direction of rotation of the shaft;

Fig. 2 is a view partly in longitudinal section and partly in elevation of a shaft at rest with my improved shock absorbing mechanism attached thereto; and Fig. 3 is a perspective view of one of the clutch collars.

In the preferred form of my invention illustrated, the drive shaft is formed in two sections 1 and 2 respectively. Motion is imparted to the section 1 from the engine and for convenience of description I shall refer to this section as the drive section and to the section 2 as the driven section. The drive section 1 is formed with a conical tapered end 3, fitting into a corresponding recess 4 in the driven section 2.

Adjacent the meeting ends of the sections and on each section a set screw or similar securing device 5 is sunk into the shaft and a coiled torsion spring 6, located around the shaft has its ends secured to the set screws 5.

A coupling sleeve 7 is positioned around the shaft, the ends of the sleeve contacting with the shaft, but the intermediate portion of the sleeve of appreciably greater diameter than the shaft and constituting a housing for the spring 6. A pair of annular internal shoulders 8 at the ends of the housing engage thrust collars 9 fixed to the shaft, and prevent longitudinal movement of the sleeve on the shaft and also serve as a coupling to prevent separation of the ends of the sections 1 and 2.

For convenience of assemblage, the coupling sleeve may be formed in two sections, 10 and 11, provided with external annular flanges 12 at their meeting ends, which are secured together by bolts 13 and nuts 14, or other suitable securing devices so that the two sleeve sections must turn together.

Integral lugs 15 and 16 are formed on the opposite ends of the sleeve sections 10 and 11 respectively and clutch collars 17 and 18 are fixed to the sections 1 and 2 respectively as shown at 19, and are provided with lugs 20 and 21, adapted to coact with the lugs 15 and 16 on the sleeve. When the shaft is at rest, these lugs 20 and 21, are preferably in alinement as shown in Fig. 2. The set screws 22 may be employed to obviate the danger of longitudinal movement of the clutch collars on the shaft.

The operation is as follows:

When the shaft is at rest as shown in Fig. 2, and the operator starts the engine turning section 1 in the direction indicated by the arrows in Fig. 1, this section will turn half a revolution winding up the spring 6 before the lug 20 engages the lug 15 causing the coupling sleeve 7 to turn with the drive section 1, and the sleeve 7 will then turn over another half revolution further winding up the spring 6 until the lug 16 engages the lug 21 and compels the driven section 2 of the shaft to turn with the drive section 1 and the sleeve 7. The shaft and its associated parts will then be in the position illustrated in Fig. 1, a continuous torsion being exerted on the driven section 2 when the parts are in running position.

When the car stops, the spring 6 will restore the parts to their normal position. If the brakes are suddenly thrown in, the shock absorbing mechanism will function to prevent sudden shock to the shaft as will be readily understood. I have illustrated the lugs 20 and 21 as normally diametrically opposed when the shaft is at rest so that one complete revolution of the drive section compels the driven section to turn. It is obvious, however, that the lugs 15 and 16 and 20 and 21 might be so arranged as to permit nearly two complete revolutions of the shaft before motion was imparted to the drive section 2.

Various slight changes and alterations might be made in the form of the parts described without departing from my invention and hence I do not wish to limit myself to the precise details set forth, but shall consider myself at liberty to make such slight changes and alterations as fairly fall within the spirit and scope of the appended claims.

I claim:

1. A device of the character stated, comprising a shaft formed in two sections, said sections capable of limited independent turning movement, a coiled torsion spring around the meeting ends of said sections, a coupling sleeve around the shaft and spring, coacting lugs carried by the sleeve and shaft sections, said lugs so arranged that turning movement of one section is imparted to the other section through the medium of the sleeve and against the torsion of the spring.

2. A device of the character stated, comprising a shaft formed in two sections, said sections capable of limited independent turning movement, a coiled torsion spring around the meeting ends of said sections, a coupling sleeve around the shaft and spring, lugs carried by the sleeve, clutch collars keyed to the shaft sections and coöperating with said lugs, said lugs and collars so arranged that turning movement of one section is imparted to the other section through the medium of the sleeve and against the torsion of the spring.

3. A device of the character stated, comprising a shaft formed in two sections, said sections capable of limited independent turning movement, a coiled torsion spring around the meeting ends of said sections, a coupling sleeve around the shaft and spring, means preventing longitudinal movement of the sleeve on the shaft, coacting lugs carried by the sleeve and shaft sections, said lugs so arranged that turning movement of one section is imparted to the other section through the medium of the sleeve and against the torsion of the spring.

4. A device of the character stated, comprising a shaft formed in two sections, said sections capable of limited independent turning movement, a coiled torsion spring around the meeting ends of said sections, a coupling sleeve around the shaft and spring, and spaced from the spring, internal annular shoulders in the sleeve, thrust collars on the shaft engaging the shoulders and preventing separation of the ends of the shaft sections, clutch collars keyed to the shaft sections, lugs carried by the sleeve and coacting with the clutch collars so that turning movement of one section is imparted to the other section against the torsion of the spring.

5. The combination with alined shaft sections, of a coiled spring extending over the meeting ends of the sections and secured to both, a coupling sleeve constituting a housing for the spring, and clutch members connecting the ends of the coupling sleeve with the respective shaft sections, the clutch members being so arranged that the housing will be turned and the spring wound by the turning of one shaft section before the other shaft section is turned by the housing.

ANSEL BRUSH MANCHESTER.